United States Patent
Wang et al.

(10) Patent No.: US 9,413,257 B2
(45) Date of Patent: Aug. 9, 2016

(54) ENHANCED FLYBACK CONVERTER

(71) Applicant: The Ohio State University, Columbus, OH (US)

(72) Inventors: Jin Wang, Powell, OH (US); Xuan Zhang, Columbus, OH (US); Ke Zou, Columbus, OH (US)

(73) Assignee: THE OHIO STATE UNIVERSITY, Columbus, OH (US)

( * ) Notice: Subject to any disclaimer, the term of this patent is extended or adjusted under 35 U.S.C. 154(b) by 82 days.

(21) Appl. No.: 13/747,428

(22) Filed: Jan. 22, 2013

(65) Prior Publication Data
US 2013/0188400 A1 Jul. 25, 2013

Related U.S. Application Data

(60) Provisional application No. 61/589,055, filed on Jan. 20, 2012.

(51) Int. Cl.
H02M 3/335 (2006.01)
H02M 1/00 (2006.01)

(52) U.S. Cl.
CPC ...... H02M 3/33569 (2013.01); H02M 3/33507 (2013.01); H02M 3/33592 (2013.01); H02M 2001/0058 (2013.01)

(58) Field of Classification Search
CPC ............................ H02J 15/00; H02M 3/33569
USPC ............... 363/21.14, 18, 21.12, 21.04, 21.06, 363/21.07, 21.08, 21.17, 21.1, 127; 323/280–285
See application file for complete search history.

(56) References Cited

U.S. PATENT DOCUMENTS

| | | | | | |
|---|---|---|---|---|---|
| 4,422,139 | A | * | 12/1983 | Burkhead | 363/21.04 |
| 5,132,888 | A | * | 7/1992 | Lo et al. | 363/17 |
| 5,208,740 | A | * | 5/1993 | Ehsani | 363/124 |
| 5,402,329 | A | * | 3/1995 | Wittenbreder, Jr. | 363/16 |
| 5,907,481 | A | | 5/1999 | Svardsjo | |
| 6,069,803 | A | * | 5/2000 | Cross | H02M 3/33569 363/21.14 |
| 6,262,901 | B1 | * | 7/2001 | Simopoulos | 363/72 |
| 6,269,012 | B1 | * | 7/2001 | Kusakabe et al. | 363/84 |
| 6,504,739 | B2 | * | 1/2003 | Phadke | H02M 1/38 363/127 |
| 6,535,407 | B1 | * | 3/2003 | Zaitsu | 363/126 |
| 6,549,432 | B1 | * | 4/2003 | Giannopoulos et al. | 363/21.14 |
| 6,580,259 | B2 | * | 6/2003 | Liu et al. | 323/282 |
| 6,590,791 | B1 | | 7/2003 | Zhou et al. | |
| 7,471,524 | B1 | | 12/2008 | Batarseh et al. | |
| 7,778,046 | B1 | | 8/2010 | Cuk et al. | |
| 2002/0110012 | A1 | * | 8/2002 | Liu et al. | 363/127 |
| 2004/0037100 | A1 | * | 2/2004 | Orr et al. | 363/131 |
| 2004/0196669 | A1 | * | 10/2004 | Thrap | H02M 1/4258 363/19 |
| 2009/0231887 | A1 | * | 9/2009 | Ye et al. | 363/21.02 |
| 2009/0244934 | A1 | * | 10/2009 | Wang | H02M 3/33592 363/21.06 |
| 2009/0278520 | A1 | * | 11/2009 | Perreault | H02M 3/07 323/282 |
| 2011/0007529 | A1 | * | 1/2011 | Usui | 363/21.12 |
| 2011/0032731 | A1 | * | 2/2011 | Coleman et al. | 363/21.12 |
| 2012/0250374 | A1 | * | 10/2012 | Knill | 363/37 |
| 2012/0281436 | A1 | * | 11/2012 | Cuk | 363/21.03 |

* cited by examiner

*Primary Examiner* — Timothy J Dole
*Assistant Examiner* — Bryan R Perez
(74) *Attorney, Agent, or Firm* — Benesch, Fiedlander, Coplan & Aronoff LLP

(57) ABSTRACT

A DC/DC flyback converter that exhibits reduced switch and transformer voltage stresses in comparison to known flyback converters. The flyback converter also employs soft switching. Embodiments of such flyback converters may be used, without limitation, in electric vehicles and hybrid electric vehicles. A front-stage of the flyback converter comprises a DC/AC step-down circuit that may be separately used for various purposes.

24 Claims, 14 Drawing Sheets

Mode 1

Mode 2

Mode 3

Mode 4

Mode 5

Mode 6

Mode 7

Mode 8

Front-Stage
Mode 1

Front-Stage
Mode 2

Front-Stage
Mode 3

Front-Stage
Mode 4

ENHANCED FLYBACK CONVERTER

CROSS-REFERENCE TO RELATED APPLICATIONS

This application claims the benefit of priority from U.S. Provisional Patent Application No. 61/589,055, filed on Jan. 20, 2012, which is hereby incorporated by reference in its entirety.

TECHNICAL FIELD

The present invention is directed to a flyback DC/DC converter, which may also be used to drive any load composed of paralleling inductors and resistors.

BACKGROUND

Flyback converters are generally known. For example, the topology of a traditional flyback converter can be seen in FIG. 1, and includes a transformer with a primary and secondary winding, and an output capacitor that supplies energy to a load. The primary winding of the transformer is directly connected to the input voltage source when the switch S is on, which causes an increase in the current and magnetic flux in the transformer and results in energy storage by the transformer. This also induces a negative voltage in the secondary winding. In this mode, the voltage stress across the transformer is $V_{in}$.

When the switch S is off, the energy stored in the transformer is transferred to the output of the converter. In this mode, the voltage stress across the switch S is $V_{in}+N1 \cdot V_{out}/N2$, and the voltage stress across the transformer is $N1 \cdot V_{out}/N2$.

Even though the flyback converter circuit of FIG. 1 is simple, it has a number of disadvantages. For example, high voltage stresses are placed on the components; the transformer has a high turns ratio; and there is unidirectional transformer flux, which not only results in large core size, but can also easily lead to core saturation. Furthermore, an additional snubber circuit is required to deal with transformer leakage inductance. DC offset current in the mutual inductance of the transformer also causes transformer core loss that cannot be reduced.

For at least these reasons, there is a need for an improved flyback converter. Embodiments of such improved flyback converters are contemplated by the invention, and various examples thereof are illustrated and described herein.

SUMMARY

Exemplary embodiments of flyback converters according to the invention include a primary winding (high-voltage) side and a secondary winding (low-voltage) side, such as may be observed in FIG. 2. The primary winding side includes several capacitors $C_1$, $C_2$, $C_3$, of which the capacitors $C_2$ and $C_3$ may be identical capacitors. The primary winding side also includes a number of switches $S_1$, $S_2$, in the form of active power devices such as, for example, MOSFETs or IGBTs.

The secondary winding side includes an output capacitor $C_4$, a number of switches $S_3$, $S_4$, also in the form of active power devices such as, for example, MOSFETs or IGBTs, and a pair of inductors $L_1$, $L_2$. Alternatively, a coupled inductor with two windings could take the place of the inductors $L_1$, $L_2$. In switching modes where switch $S_1$ is turned on, the inductor $L_1$ stores energy. In switching modes where switch $S_1$ is turned off, the inductor $L_1$ releases its energy to the load R. In switching modes where switch $S_2$ is turned on, the inductor $L_2$ stores energy. In switching modes where switch $S_2$ is turned off, the inductor $L_2$ releases its energy to the load R. The output voltage of a flyback converter of the invention may be regulated by changing the switch duty ratio and deadband of the switches $S_1$, $S_2$ on the primary winding side.

In operation, the primary side switches $S_1$, $S_2$ may be driven with a symmetrical duty ratio. In order to reduce power loss on the secondary side, the secondary side switches $S_3$, $S_4$ may be operated in synchronous rectification. In order to obtain high efficiency on both the primary and secondary sides of the transformer when deadband is applied, the primary side switch $S_1$ and the secondary side switch $S_4$ may be driven complementarily and the primary side switch $S_2$ and the secondary side switch $S_3$ may be driven complementarily.

Flyback converter embodiments according to the invention are improvements over known converters in a multitude of ways. For example, and without limitation, flyback converters according to the invention exhibit switch and transformer voltage stresses that are less than the switch and transformer stresses present in known flyback converters. Consequently, switches with a lower rated breakdown voltage may be used, a lower number of transformer turns may be used to gain the same output voltage of a typical known flyback converter, and the flux may be lowered, thereby resulting in reduced core loss.

The transformer flux of a flyback converter according to the invention is also bidirectional (instead of unidirectional), which allows for improved core utilization or a reduction of the core size and, is beneficial to core saturation prevention. Furthermore, natural current routes exist, which permit the release of energy stored in the transformer leakage inductance when the switches are turned off and eliminates the need for snubber circuits.

Flyback converters according to the invention also employ zero-current switching, which results in a natural, soft switching, that reduces switching losses and increases efficiency. Very low DC offset current in the transformer mutual inductance additionally reduces transformer core loss and allows for the use of a smaller transformer core and a reduced transformer profile. Further, the use of a post-stage circuit cancels the ripple current typically seen at the output capacitor of such a flyback converter, so a smaller output capacitor can be employed. Further yet, on the low-voltage side, only two low-side gate drivers are used, which eliminates the need for a high-side gate driver and the more complex design associated therewith.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
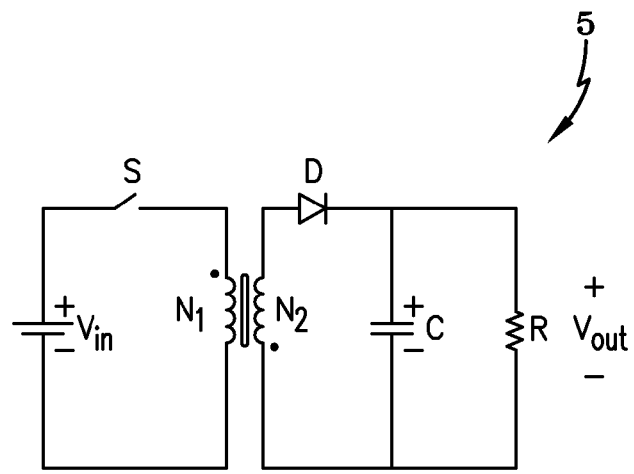
FIG. 1 is a circuit diagram of a known flyback converter.

A traditional flyback converter 5 can be observed in FIG. 1. In contrast, the topology of an exemplary flyback converter 10 according to the invention is depicted in FIG. 2.

Figure 2:
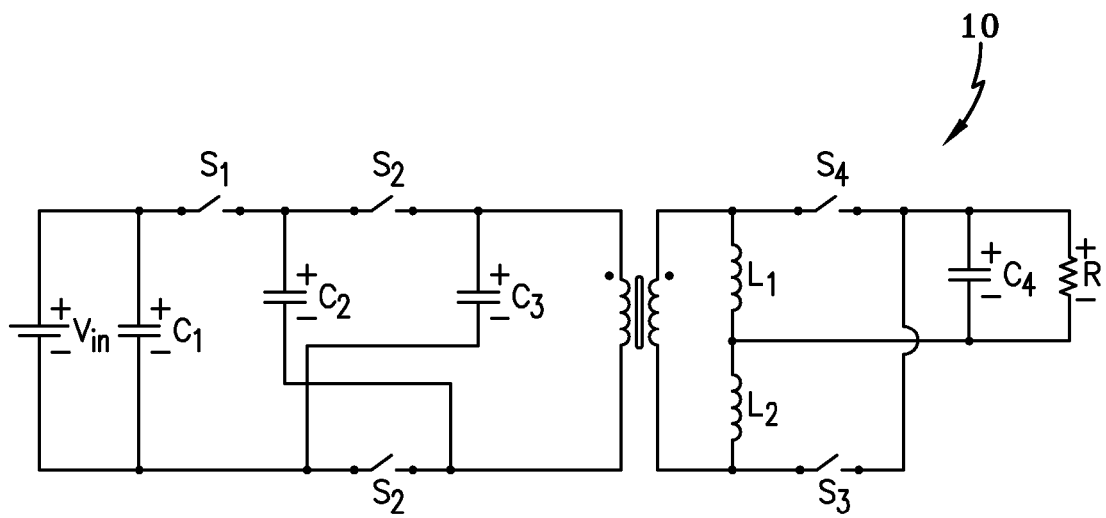
FIG. 2 is a circuit diagram that schematically depicts an exemplary DC/DC flyback converter according to the invention.

As shown in FIG. 2, the improved flyback converter 10 includes a primary winding (high voltage) side and a secondary winding (low voltage) side. The primary winding side includes several capacitors $C_1$, $C_2$, $C_3$, of which the capacitors $C_2$ and $C_3$ are identical capacitors. The primary winding side also includes a number of switches $S_1$, $S_2$, in the form of active power devices such as, for example, MOSFETs or IGBTs. The secondary winding side includes an output capacitor $C_4$, a pair of switches $S_3$, $S_4$, also in the form of active power devices such as, for example, MOSFETs or IGBTs, and a pair of inductors $L_1$, $L_2$. In an alternative embodiment, a coupled inductor with two windings may be substituted for the inductors $L_1$, $L_2$. The circuits of the primary and secondary winding sides are separated by a transformer.

The primary winding side circuit is a DC/AC circuit with a 3:1 voltage step-down ratio, which reduces voltage stresses on the primary winding side switches, and on the transformer. The secondary winding side circuit may be a traditional rectifying circuit or a ripple current cancelling circuit. Synchronous rectification may be applied in the secondary winding circuit.

In switching modes where switch $S_1$ is turned on, inductor $L_1$ stores energy. In switching modes where switch $S_1$ is turned off, inductor $L_1$ releases its energy to the load R. In switching modes where switch $S_2$ is turned on, inductor $L_2$ stores energy. In switching modes where switch $S_2$ is turned off, inductor $L_2$ releases its energy to the load R. The output voltage of a flyback converter of the invention may be regulated by changing the switch duty ratio and deadband of the switches $S_1$, $S_2$ on the primary winding side.

In operation, the primary side switches $S_1$, $S_2$ are preferably driven with a symmetrical duty ratio, and the secondary side switches $S_3$, $S_4$ are preferably operated in synchronous rectification in order to reduce power loss on the secondary side. When deadband is applied, the primary side switch $S_1$ and the secondary side switch $S_4$ are preferably complementarily driven and the primary side switch $S_2$ and the secondary side switch $S_3$ are preferably complementarily driven, in order to obtain high efficiency on both the primary and secondary sides of the transformer.

Figure 3:
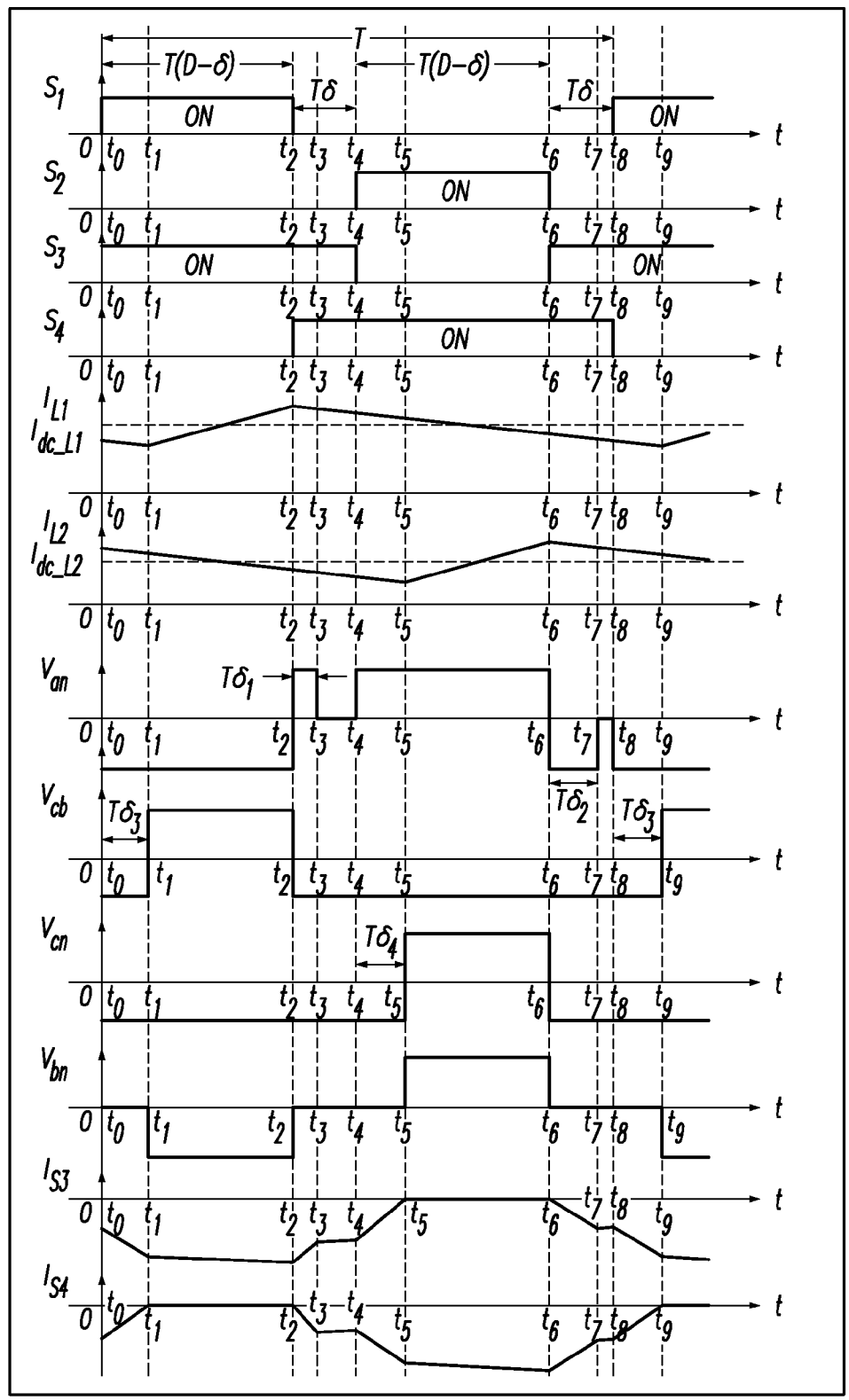
FIG. 3 is a graphical (waveform) representation of the eight operation modes within a switching period of the flyback converter of FIG. 1 when operating in steady state.

FIG. 3 graphically represents steady state operation of the flyback converter 10 of FIG. 1. The waveforms shown in FIG. 3 are illustrative of the performance of the flyback converter 10 when operating with a fixed duty ratio (50% in this example), but a varying deadband ratio. In steady state operation, the converter 10 is shown to have 8 operation modes (i.e., Modes 1-8) within a switching period, including 4 active modes and 4 deadband modes.

In steady state operation, there is voltage-second balance for the inductors $L_1$ and $L_2$ in a switching cycle. Therefore, the voltage-second balance for inductors $L_1$ and $L_2$ can be expressed as in the following equation, where $V_c$ is the voltage of the capacitors $C_2$ and $C_3$ and $V_{LS}$ and $V_{LS'}$ are the voltages of $L_S$ (transformer leakage inductance) in Mode 1 and Mode 5:

$$(V_{in}-2V_c-V_{LS})\cdot T\cdot(D-\delta-\delta_3)=(V_c-V_{LS'})\cdot T\cdot(D-\delta-\delta_4)$$

Because $L_S$ is much smaller than $L_1$ and $L_2$, $V_{LS}$ and $V_{LS'}$ can be ignored. Also, because $\delta_3$ and $\delta_4$ are transient time ratios that are much smaller than transient time $\delta$, they too can be ignored. Therefore, $V_c$ can be simplified as:

$$V_c = \frac{V_{in}}{3}$$

Accordingly, the voltage stresses of the primary winding side switches are:

$$V_{S1(max)} = V_{S2(max)} = \frac{2V_{in}}{3}$$

In steady state, there is also a voltage-second balance for the inductor $L_2$. As a result, the output voltage may be expressed as in the following equation, where N is the transformer turns ratio:

$$V_{out} = \frac{L_2 \cdot (D - \delta)}{(L_1 + L_2) \cdot (1 - D + \delta) + L_2 \cdot (D - \delta)} \cdot \frac{V_{in}}{3N}$$

FIGS. 4-12 are equivalent circuit representations of the first (Mode 1) through eighth (Mode 8) operation modes graphically depicted in FIG. 3. It should be noted with respect to FIGS. 4-12 that the transformer mutual inductance is much larger than the inductance of the inductors $L_1$, $L_2$. Therefore, the transformer mutual inductance is not dominating inductor in this circuit, and it has been ignored in the equivalent circuit for purposes of simplified (but accurate) illustration. Reference character $L_S$ in FIGS. 4-12 represents transformer leakage inductance.

Figure 4:
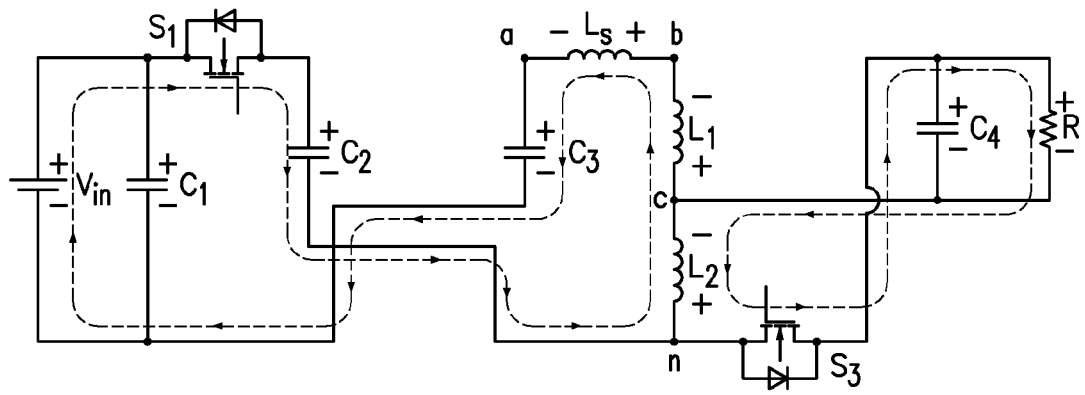
FIG. 4 is an equivalent circuit representation of the first (Mode 1) of the eight operation modes graphically depicted in FIG. 3.

FIG. 4 is an equivalent circuit diagram that schematically represents operation Mode 1 of the flyback converter 10 of FIG. 2. In Mode 1, which is representative of the time interval designated as $t_1$-$t_2$ in FIG. 3, the primary side switch $S_1$ and secondary side switch $S_3$ are ON, while the primary side switches $S_2$ and secondary side switch $S_4$ are OFF. The body diode of switch $S_4$ is open, and switch $S_3$ operates in synchronous rectification therewith, conducting to release the energy stored in inductor $L_2$ to the load R. The input voltage source $V_{in}$, capacitor $C_2$, inductor $L_1$, inductor $L_2$ and capacitor $C_3$ are connected in series. Capacitors $C_2$ and $C_3$ are being charged in this mode, but the voltage of the capacitors $C_2$, $C_3$ remains about ⅓ of $V_{in}$. Also, the voltage stress on switch $S_2$ is about ⅔ of $V_{in}$, and the voltage stress on the transformer is about ⅓ of $V_{in}$.

Figure 5:
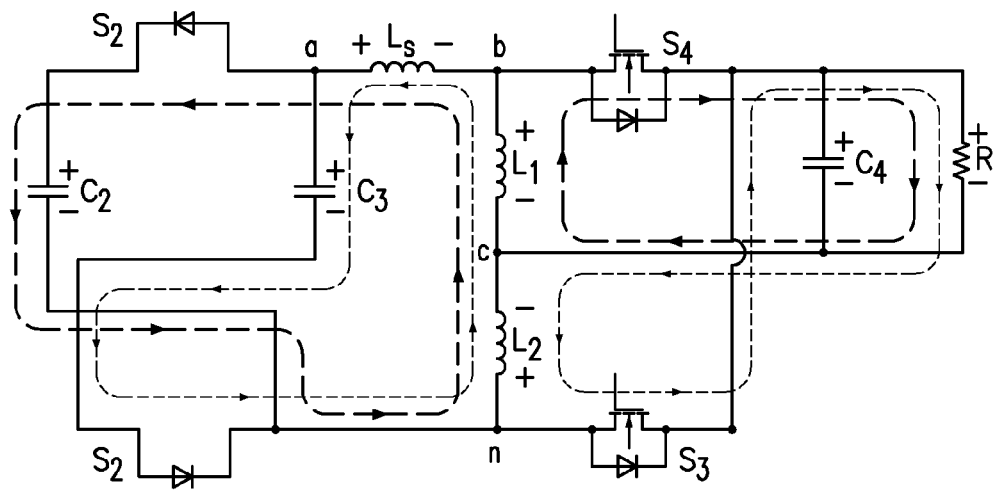
FIG. 5 is an equivalent circuit representation of the second (Mode 2) of the eight operation modes graphically depicted in FIG. 3.

FIG. 5 is an equivalent circuit diagram that schematically represents operation Mode 2 of the flyback converter 10 of FIG. 2. In Mode 2, which is representative of the time interval designated as $t_2$-$t_3$ in FIG. 3, the primary side switches $S_1$ and $S_2$ are OFF, while the secondary side switches $S_3$ and $S_4$ are ON and operate in synchronous rectification. The transformer leakage inductance $L_S$ begins to release its energy via the body diode of switch $S_2$ back to the capacitors $C_2$ and $C_3$. Switches $S_3$ and $S_4$ also conduct to release the energy stored in the inductors $L_1$, $L_2$ to the load R. Capacitors $C_2$ and $C_3$ are being charged in this mode, but the voltage of the capacitors $C_2$, $C_3$ remains about ⅓ of $V_{in}$. Also, the voltage stress on switch $S_1$ is about ⅔ of $V_{in}$, and the voltage stress on the transformer is about ⅓ of $V_{in}$.

Figure 6:
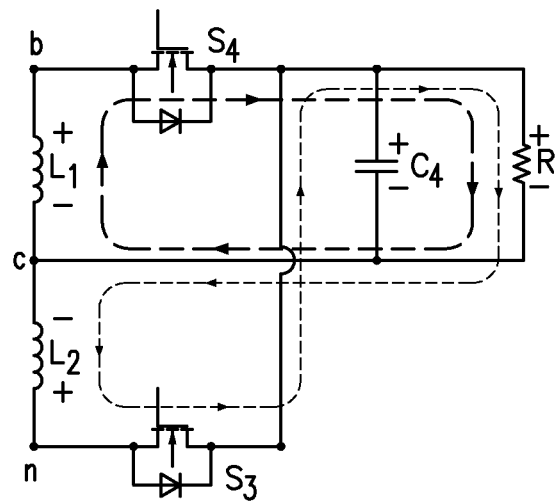
FIG. 6 is an equivalent circuit representation of the third (Mode 3) of the eight operation modes graphically depicted in FIG. 3.

FIG. 6 is an equivalent circuit diagram that schematically represents operation Mode 3 of the flyback converter 10 of FIG. 2. In Mode 3, which is representative of the time interval designated as $t_3$-$t_4$ in FIG. 3, the primary side switches $S_1$ and $S_2$ are OFF, while the secondary side switches $S_3$ and $S_4$ are ON and continue to operate in synchronous rectification and to release the energy stored in the inductors $L_1$, $L_2$ to the load R. During Mode 3, the energy stored in the transformer leakage inductance $L_S$ is completely released. The voltage of the capacitors $C_2$, $C_3$ remains about ⅓ of $V_{in}$, and the voltage stress on switches $S_1$ and $S_2$ is about ⅓ of $V_{in}$. The voltage stress on the transformer is 0.

Figure 7:
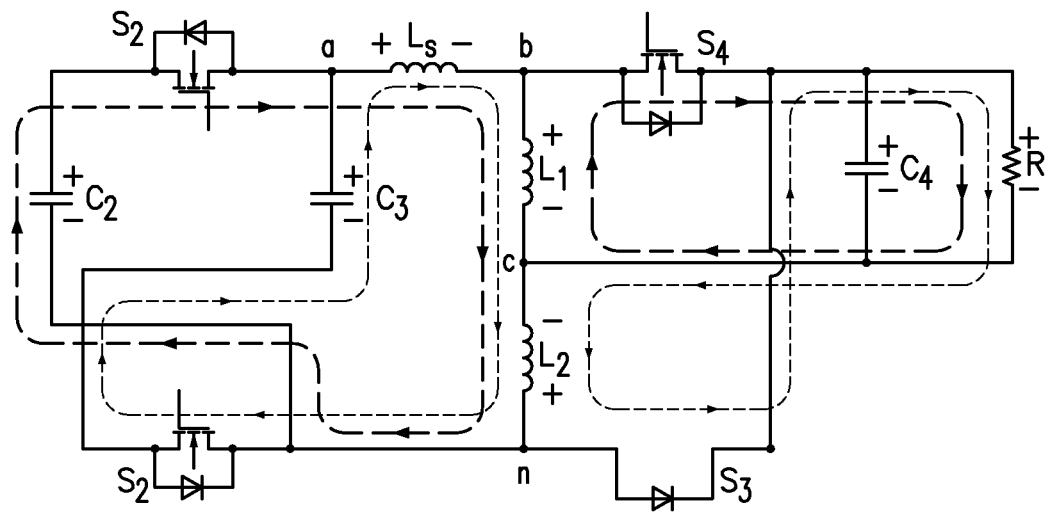
FIG. 7 is an equivalent circuit representation of the fourth (Mode 4) of the eight operation modes graphically depicted in FIG. 3.

FIG. 7 is an equivalent circuit diagram that schematically represents operation Mode 4 of the flyback converter 10 of FIG. 2. In Mode 4, which is representative of the time interval designated as $t_4$-$t_5$ in FIG. 3, the primary side switch $S_1$ and secondary side switch $S_3$ are OFF, while the primary side switches $S_2$ and secondary side switch $S_4$ are ON and continue to operate in synchronous rectification. The body diode of switch $S_3$ is forward biased and the current of switch $S_3$ is transferred to switch $S_4$. Switch $S_4$ and the body diode of switch $S_3$ conduct to release the energy stored in the inductors $L_1$, $L_2$ to the load R. Capacitors $C_2$ and $C_3$ are being discharged in Mode 4, but the voltage of the capacitors $C_2$, $C_3$ remains about ⅓ of $V_{in}$. The voltage stress on switch $S_1$ is about ⅔ of $V_{in}$. The voltage stress on the transformer is about ⅓ of $V_{in}$.

Figure 8:
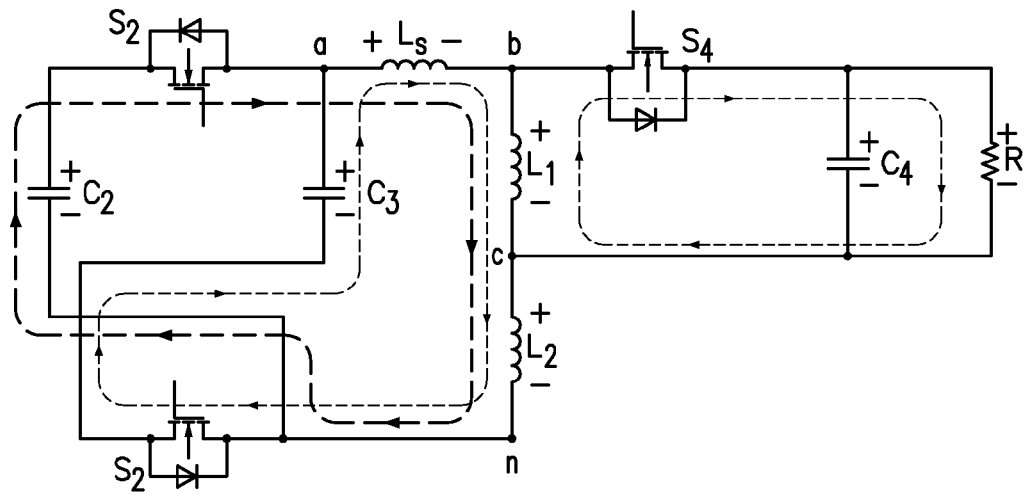
FIG. 8 is an equivalent circuit representation of the fifth (Mode 5) of the eight operation modes graphically depicted in FIG. 3.

FIG. 8 is an equivalent circuit diagram that schematically represents operation Mode 5 of the flyback converter 10 of FIG. 2. In Mode 5, which is representative of the time interval designated as $t_5$-$t_6$ in FIG. 3, the primary side switch $S_1$ and secondary side switch $S_3$ are OFF, while the primary side switches $S_2$ and secondary side switch $S_4$ are ON and continue to operate in synchronous rectification. At $t_5$, the current $i_{S3}$ through switch $S_3$ reaches 0, so in this mode the body diode of switch $S_3$ is open. Switch $S_4$ conducts to release the energy stored in inductor $L_1$ to the load R. Capacitors $C_2$ and $C_3$ are again being charged, but the voltage of the capacitors $C_2$, $C_3$ remains about ⅓ of $V_{in}$. The voltage stress on switch $S_1$ is about ⅔ of $V_{in}$, while the voltage stress on the transformer is about ⅓ of $V_{in}$.

Figure 9:
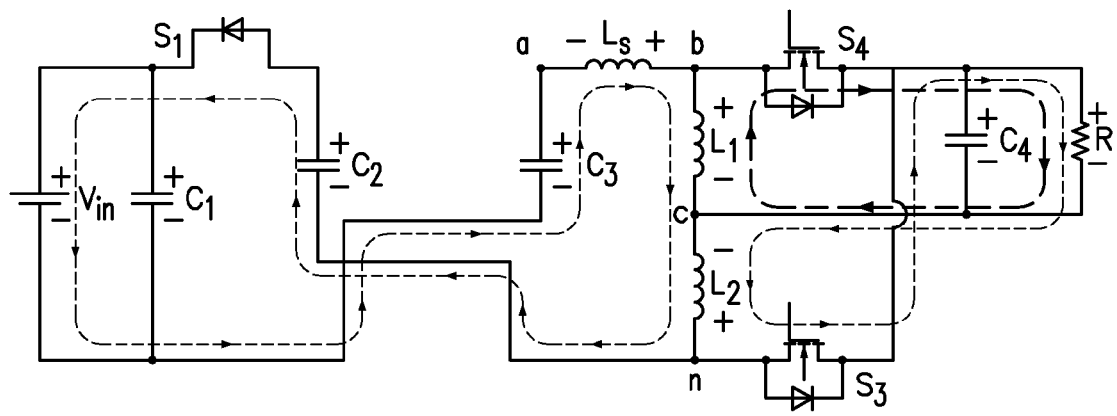
FIG. 9 is an equivalent circuit representation of the sixth (Mode 6) of the eight operation modes graphically depicted in FIG. 3.

FIG. 9 is an equivalent circuit diagram that schematically represents operation Mode 6 of the flyback converter 10 of FIG. 2. In Mode 6, which is representative of the time interval designated as $t_6$-$t_7$ in FIG. 3, the primary side switches $S_1$ and $S_2$ are OFF, while the secondary side switches $S_3$ and $S_4$ are ON and operate in synchronous rectification. At this point, the transformer leakage inductance $L_S$ begins to release its energy, via the body diode of switch $S_1$, back to the input voltage source $V_{in}$ and to capacitor $C_1$. Switches $S_3$ and $S_4$ conduct to release the energy stored in inductors $L_1$ and $L_2$ to the load R. The capacitors $C_2$ and $C_3$ are being discharged in this mode, but the voltage of the capacitors $C_2$, $C_3$ remains about ⅓ of $V_{in}$. The voltage stress on switch $S_2$ is about ⅔ of $V_{in}$, while the voltage stress on the transformer is about ⅓ of $V_{in}$.

Figure 10:
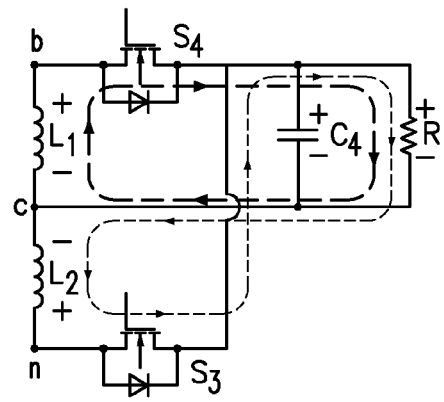
FIG. 10 is an equivalent circuit representation of the seventh (Mode 7) of the eight operation modes graphically depicted in FIG. 3.

FIG. 10 is an equivalent circuit diagram that schematically represents operation Mode 7 of the flyback converter 10 of FIG. 2. In Mode 7, which is representative of the time interval designated as $t_7$-$t_8$ in FIG. 3, the primary side switches $S_1$ and $S_2$ are OFF, while the secondary side switches $S_3$ and $S_4$ are ON. Switches $S_3$ and $S_4$ continue to operate in synchronous rectification and conduct to release the energy stored in the inductors $L_1$ and $L_2$ to the load R. In Mode 7, the energy stored in the transformer leakage inductance $L_S$ is again completely released. The voltage of the capacitors $C_1$ and $C_2$ remains about ⅓ of $V_{in}$. The voltage stress on switches $S_1$ and $S_2$ is about ⅓ of $V_{in}$, while the voltage stress on the transformer is again 0.

Figure 11:
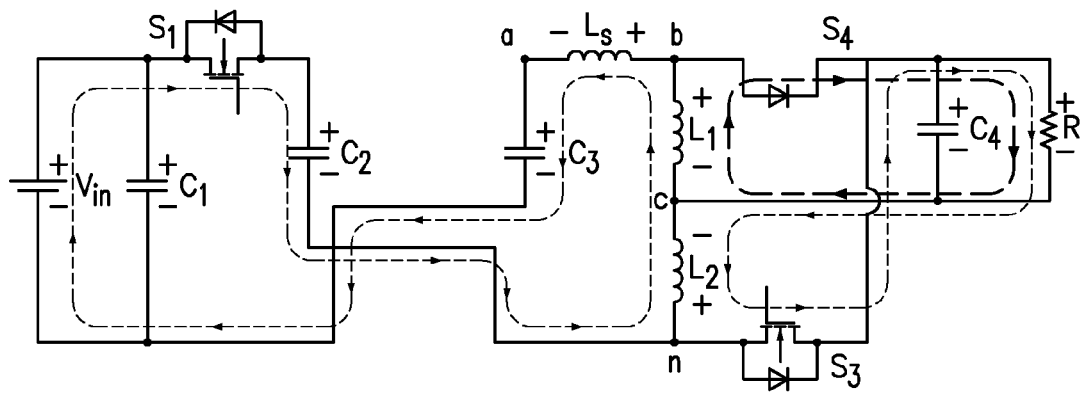
FIG. 11 is an equivalent circuit representation of the eighth (Mode 8) of the eight operation modes graphically depicted in FIG. 3.

FIG. 11 is an equivalent circuit diagram that schematically represents operation Mode 8 of the flyback converter 10 of FIG. 2. In Mode 8, which is representative of the time interval designated as $t_8$-$t_9$ in FIG. 3, the primary side switch $S_1$ and secondary side switch $S_3$ are ON, while the primary side switches $S_2$ and secondary side switch $S_4$ are OFF. The body diode of switch $S_4$ is forward biased and switch $S_3$ and switch $S_4$ continue to operate in synchronous rectification. The current of switch $S_4$ is transferred to switch $S_3$ which, along with the body diode of switch $S_4$, conduct to release the energy stored in inductors $L_2$ and $L_1$ to the load R. Capacitors $C_2$ and $C_3$ are being charged in Mode 8, but the voltage of the capacitors $C_2$, $C_3$ remains about ⅓ of $V_{in}$. The voltage stress on switch $S_2$ is about ⅔ of $V_{in}$, while the voltage stress on the transformer is about ⅓ of $V_{in}$.

During operation of the exemplary flyback converter 10 of FIG. 2, as represented in the waveforms of FIG. 3 and the equivalent circuits of FIGS. 4-11, the duty ratio was fixed at 50%. However, even with a fixed duty ratio, the output voltage can be changed by regulating the deadband ratio since the output voltage can be generally represented as:

$$V_{out} = (0.5 - \delta) \cdot \frac{V_{in}}{3N}$$

where N is the transformer turns ratio and δ is the deadband ratio.

Figure 12:
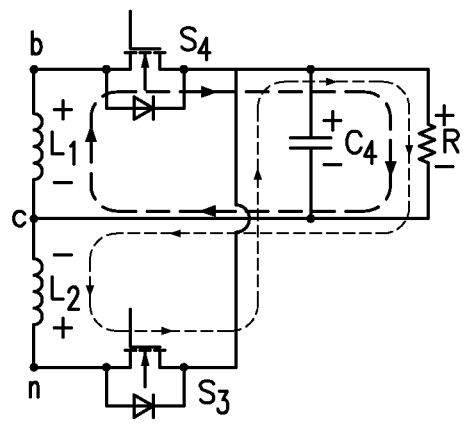
FIG. 12 graphically illustrates output voltage vs. deadband ratio for a flyback converter as shown in FIG. 1 having a particular transformer turns ratio and operating at a particular input voltage.

FIG. 12 graphically represents the curve of output ratio vs. deadband ratio of a flyback converter. In this example, $V_{in}$=400 V and N=4.7.

As described above, the DC/DC flyback converter of FIG. 2 includes a primary winding side and a secondary winding side. The primary winding side of the circuit may be considered to be a high voltage front-stage circuit. The front-stage circuit itself may have applications other than its use in a flyback converter of the invention. The operation of the front-stage circuit is explained in more detail below and in corresponding FIGS. 13-18.

Figure 13:
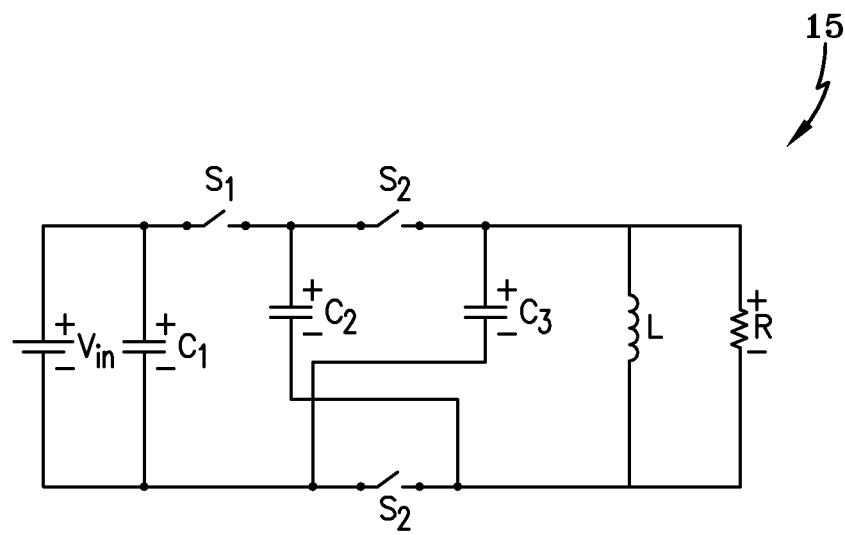
FIG. 13 is an equivalent circuit diagram that schematically represents the front-stage (primary side) of the flyback converter depicted in FIG. 1.

An equivalent circuit diagram that schematically represents the front-stage circuit 15 appears in FIG. 13. The front-stage circuit is a step-down DC/AC circuit, the output of which is AC, and the peak value of which is ⅓ of the input DC voltage. The equivalent front-stage circuit is shown to include the capacitors $C_1$, $C_2$, $C_3$, and the switches $S_1$, $S_2$, in the form of active power devices, as shown in FIG. 2 and described above. The equivalent front-stage circuit 15 is also shown to include an inductor L. The circuit is again connected to a load R.

In operation, the switches $S_1$, $S_2$ are preferably symmetrically driven. When deadband is applied, the driving signals of switches $S_1$ and $S_2$ are still symmetrical. The output power can be regulated by changing the switch duty ratio and deadband ratio of switches $S_1$ and $S_2$. In deadband modes, where switches $S_1$ and $S_2$ are both turned off, the inductor L releases its energy to the load R.

Figure 14:
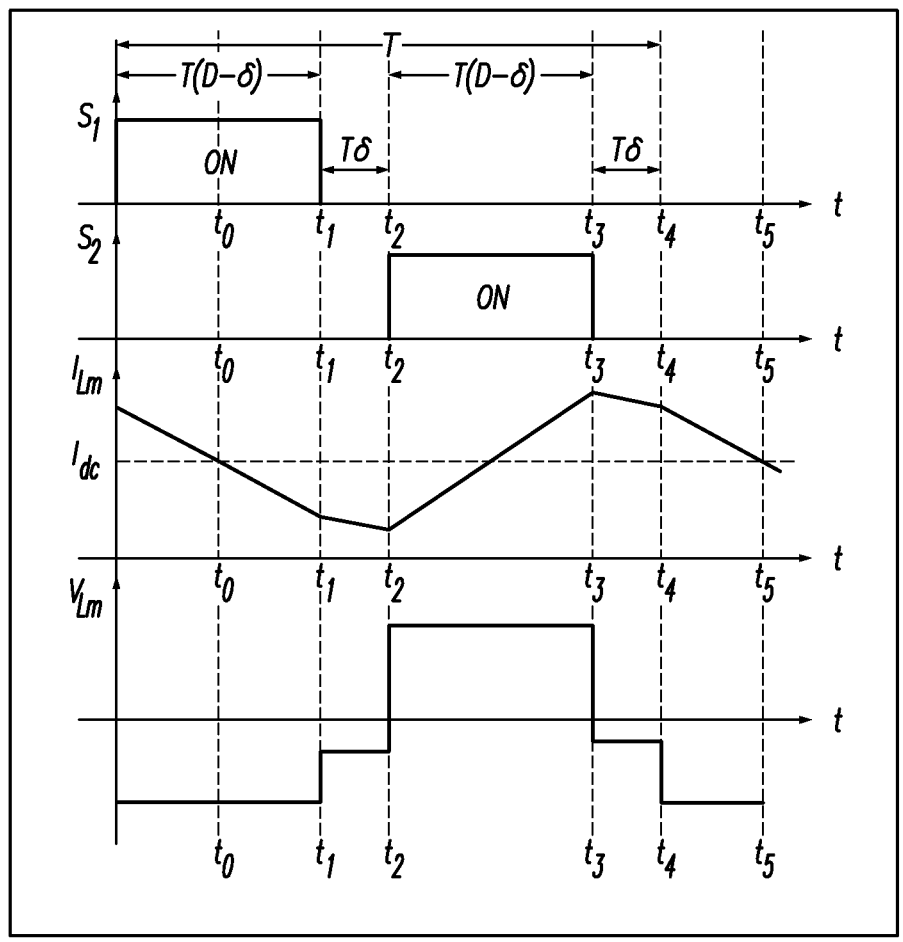
FIG. 14 is a graphical (waveform) representation of the four operation modes within a switching period of the flyback converter front-stage shown in FIG. 13 when operating in steady state.

FIG. 14 graphically represents steady state operation of the front-stage circuit 15 of FIG. 13. The waveforms shown in FIG. 14 are illustrative of the performance of the front-stage circuit 15 when operating with a fixed duty ratio (50% in this example), but a varying deadband ratio. In steady state operation, the front-stage circuit 15 is shown to have 4 operation modes (i.e., Modes 1-4) within a switching period. FIGS. 15-18 are equivalent circuit representations of the first (Mode 1) through fourth (Mode 4) front-stage circuit operation modes graphically depicted in FIG. 14.

Figure 15:
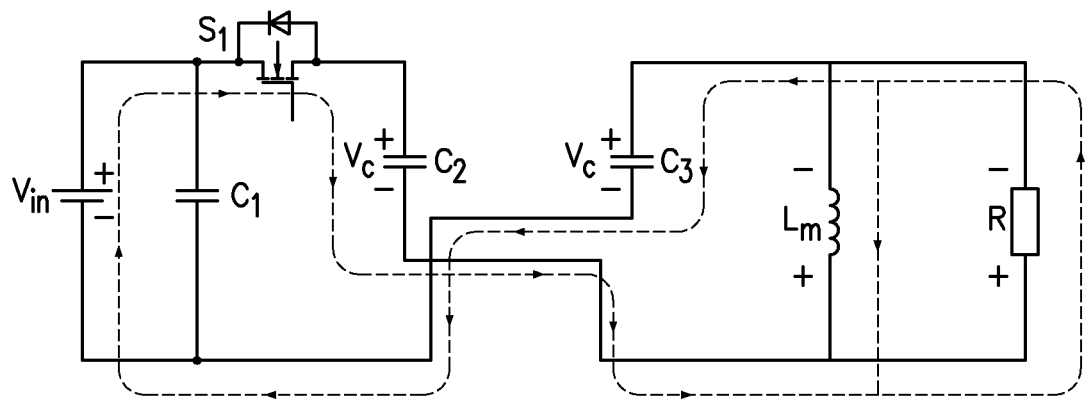
FIG. 15 is an equivalent circuit representation of the first (Mode 1) of the four operation modes graphically depicted in FIG. 14.

FIG. 15 is an equivalent circuit diagram that schematically represents front-stage circuit operation Mode 1. In Mode 1, which is representative of the time interval designated as $t_0$-$t_1$ in FIG. 14, switches $S_1$ and $S_2$ are OFF. The input voltage source $V_{in}$, and the capacitors $C_2$, $C_3$ and the load R are connected in series. Capacitors $C_2$ and $C_3$ are charged. The voltage across the load R is negative, and the peak value is about ⅓ of $V_{in}$.

Figure 16:
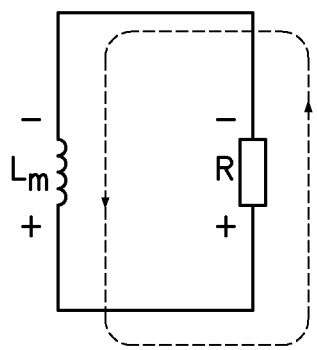
FIG. 16 is an equivalent circuit representation of the second (Mode 2) of the four operation modes graphically depicted in FIG. 14.

FIG. 16 is an equivalent circuit diagram that schematically represents front-stage circuit operation Mode 2. In Mode 2, which is representative of the time interval designated as $t_1$-$t_2$ in FIG. 14, switches $S_1$ and $S_2$ are OFF. The inductor L releases its energy to the load R.

Figure 17:
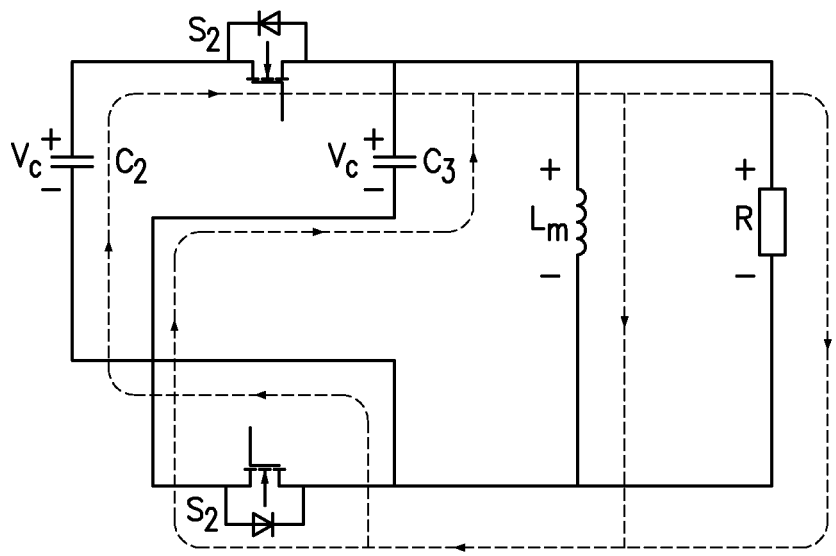
FIG. 17 is an equivalent circuit representation of the third (Mode 3) of the four operation modes graphically depicted in FIG. 14.

FIG. 17 is an equivalent circuit diagram that schematically represents front-stage circuit operation Mode 3. In Mode 3, which is representative of the time interval designated as $t_2$-$t_3$ in FIG. 14, switch $S_1$ is OFF and switch $S_2$ is ON. Capacitors $C_2$ and $C_3$ are load connected in parallel, and are discharged. The voltage across the load R is positive, and the peak value is about ⅓ of $V_{in}$.

Figure 18:
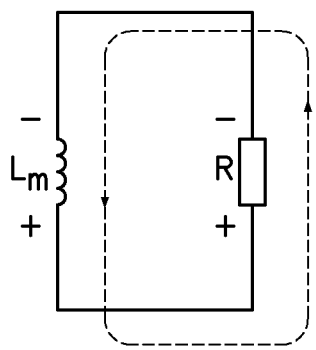
FIG. 18 is an equivalent circuit representation of the fourth (Mode 4) of the four operation modes graphically depicted in FIG. 14.

FIG. 18 is an equivalent circuit diagram that schematically represents front-stage circuit operation Mode 4. In Mode 4, which is representative of the time interval designated as $t_3$-$t_4$ in FIG. 14, switches $S_1$ and $S_2$ are OFF, and the inductor L again releases its energy to the load R.

EXAMPLE 1

A 1.5 kW simulation model was built using Powersim PSIM simulation software to verify the analysis. The particulars of the model were:
Input voltage range=200 V to 400 V;
Transformer turns ratio (N)=2;
Switching frequency ($F_s$)=300 kHz;
Inductors $L_1$=$L_2$=1 μL;
Capacitors $C_2$=$C_3$=1 μF;
D=0.5;
δ=0.07; and
Capacitor $C_4$=10 μf.

Figure 19:
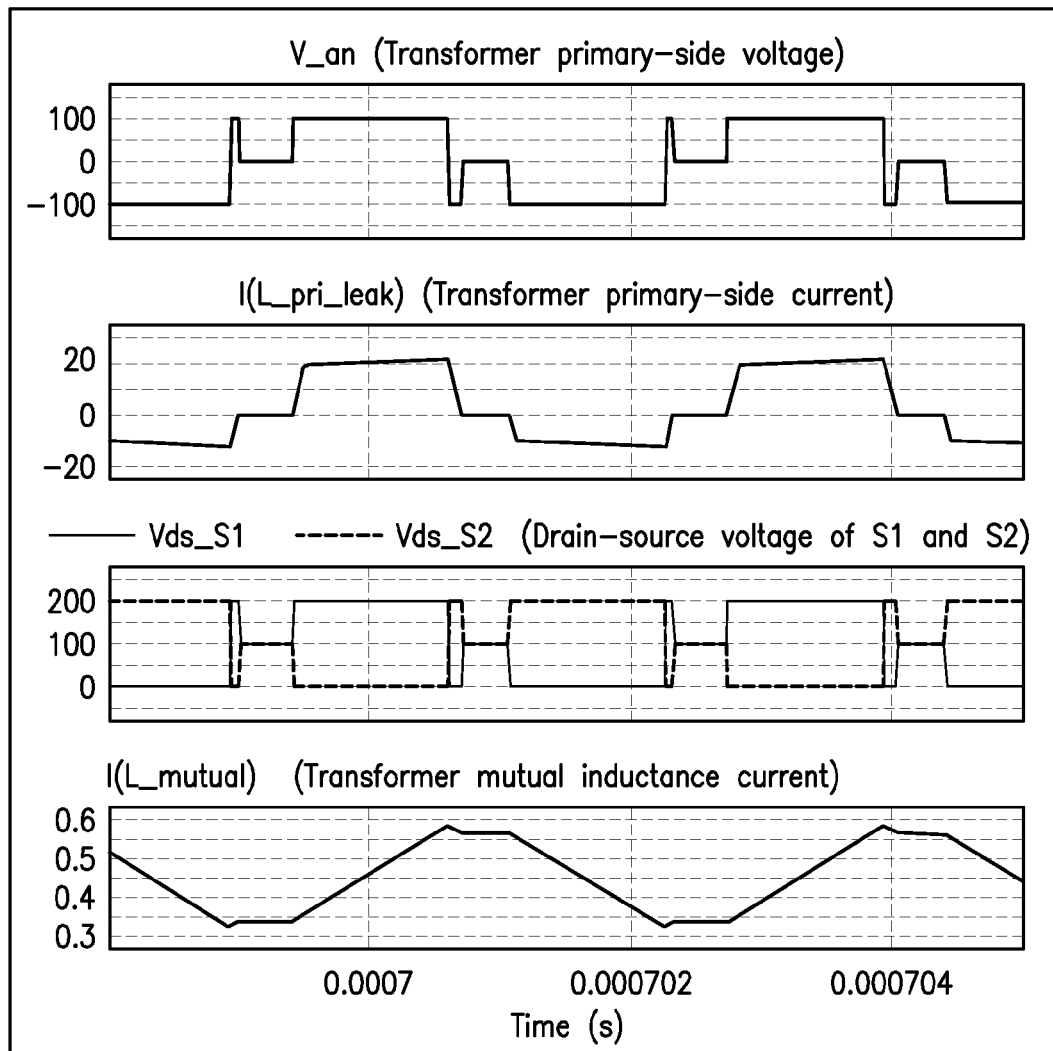
FIGS. 19-20 are steady-state simulation waveforms for a 1.5 kW simulation model of a power converter circuit of the invention.
Figure 20:
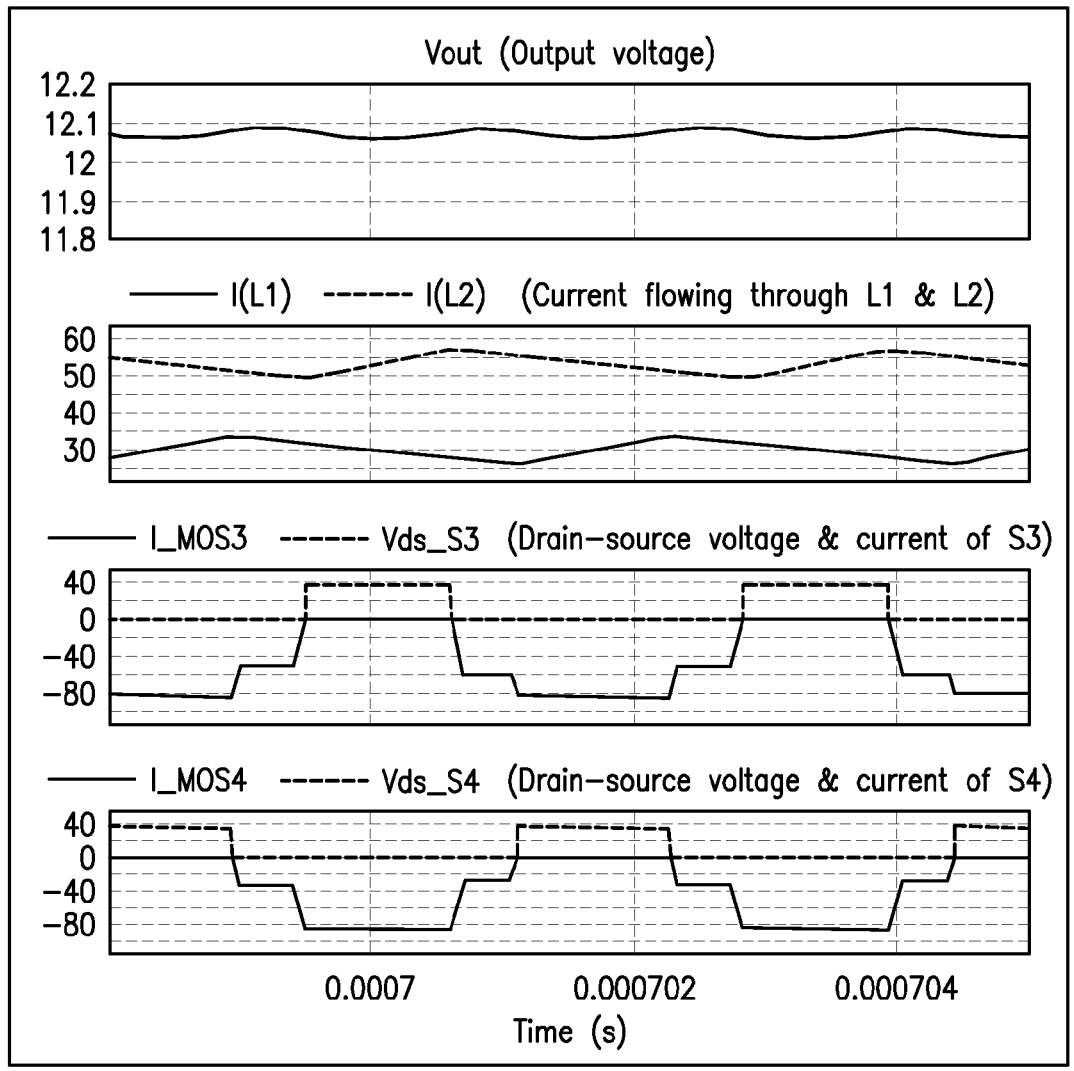

Steady-state simulation waveforms for the 1.5 kW simulation model with a 200 V input voltage are shown in FIGS. 19-20. It can be seen from FIG. 20 that a stable 12 V output voltage was produced. The voltage stresses on switches $S_1$ and $S_2$ were reduced to ⅔ of $V_{in}$, and the voltage stress on the transformer was reduced to ⅓ of $V_{in}$. Soft-switching was achieved for the turning on of switches $S_1$ and $S_2$, and both the turning on and turning off of switches $S_3$ and $S_4$. Output ripple current was cancelled.

EXAMPLE 2

Figure 21A:
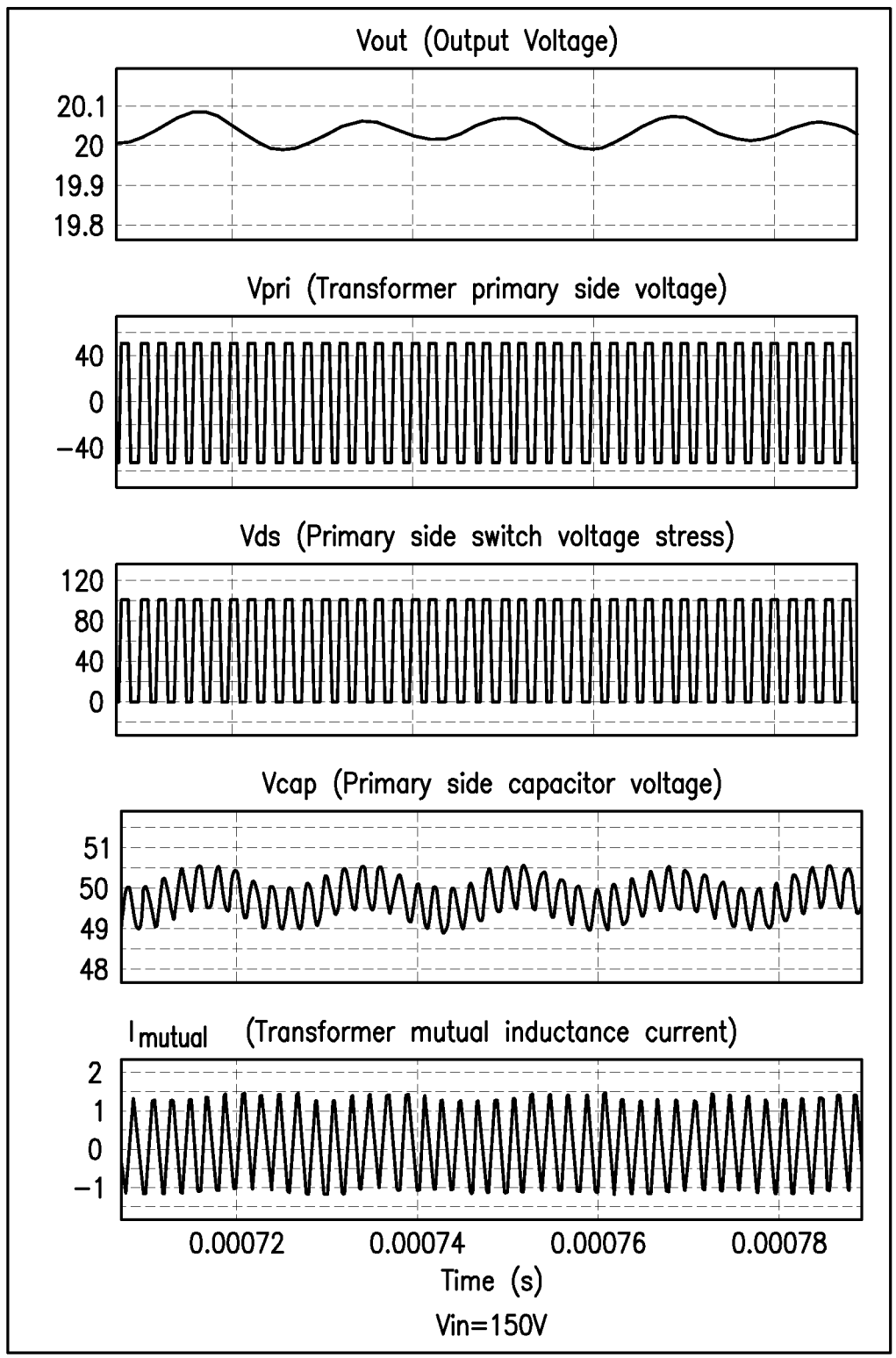
FIG. 21 depicts the steady-state waveforms of another simulated power converter circuit of the invention.
Figure 21B:
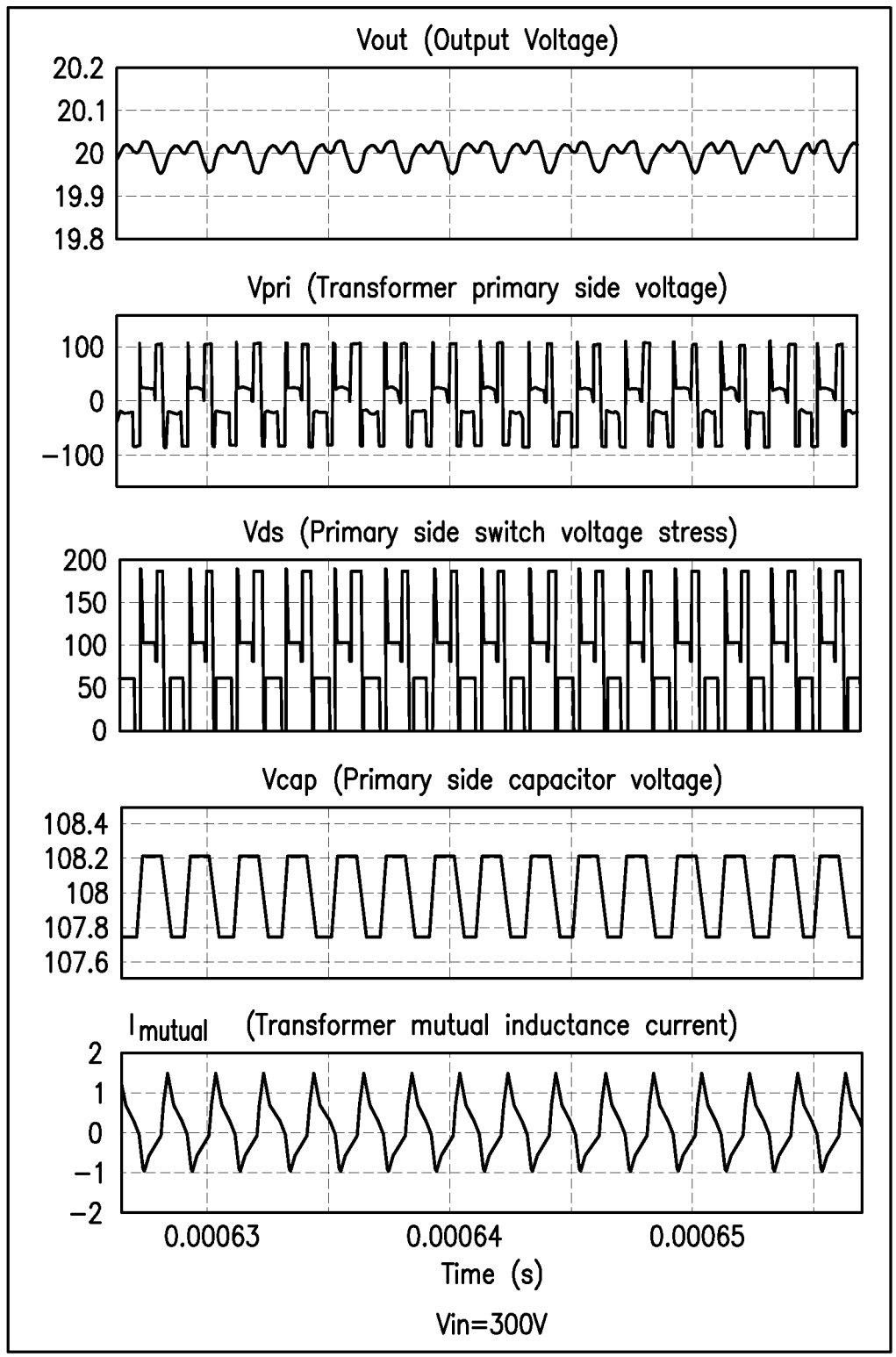

In a further simulation of a circuit according to the invention, the mutual inductance was set as 20 μH and the low-voltage side inductors were set as 2 μH/each. The output capacitor was set as 20 μF and the two capacitors $C_2$, $C_3$ in the quasi-switched capacitor circuit were both set at 2 μF. The load was set to 90 W at 20 V. The optimum turns ratio of the transformer is 1:1, which simplifies the transformer design and minimizes the winding loss. However, to demonstrate the operating principle of the circuit, the turns ratio of the transformer was set as 5:4 in the simulation. The results of the simulation at an input voltage $V_{in}$ of 150 V and 300V are shown in FIGS. 21A-21B, respectively.

As shown in the simulation results, when the input voltage is 150V, the switches in the circuit are operating at a 50% duty ratio. The voltage stresses of the switching devices are ⅔ of the input voltage (100 V). There is no DC component in the mutual inductance. The peak value of the input voltage to the primary winding side of the transformer is 50V.

When the input voltage is 300 V, the duty ratio of the switches is no longer 50%. At the point when the three switches on the primary winding side are all turned off (a necessary state of the circuit), the energy stored in the mutual inductance will be freely transferred into the secondary winding side of the transformer. If the energy in the mutual inductance is fully released before the next switching cycle, the voltage stress on the switches will have stair-waveforms, as shown in FIG. 21. It can also be observed in FIG. 21 that the maximum voltage stress on the switches is slightly lower than 200 V (⅔ of the input voltage), and the voltage on the two capacitors in the primary winding side of the circuit is slightly higher than 100 V (⅓ of the input voltage). There is a small DC offset in the mutual inductance current.

The simulated circuit of this particular example may be generally summarized as follows. The primary side of the circuit has a quasi-switched capacitor (QSC) structure. The QSC circuit has three switches and two capacitors. The capacitors are not resonant link capacitors. At 500 kHz and 90 W, each capacitor can be as small as 2 μf. Based on the characteristics of the voltage source, an input filter capacitor may be required. The voltage stress on the switches and capacitors is lower than the input voltage, with the voltage stress on the switches being smaller than ⅔ of the input voltage. The secondary side of the circuit may be a traditional synchronous current doubler circuit. The filter inductor in the circuit may be as small as approximately 2 μH.

It can also be understood from this simulation that the exact value of the switch voltage stresses will change with the duty ratio of the switches. However, in comparison to traditional flyback and forward converters, the switching devices of the simulated circuit are subjected to much smaller voltage stresses, which is very useful with respect to GaN devices.

Furthermore, the transformer input voltage is much less than the input voltage of the simulated circuit. For example, when the duty ratio is 50%, the transformer input voltage is about ⅓ of the input voltage. A smaller input voltage means a possible reduction in transformer core size.

The transformer of the simulated circuit exhibits bi-directional excitation. Therefore, in comparison to a traditional flyback converter, the circuit has a reduced DC current in the mutual inductance. For example, at about a 50% duty ratio, the current has no DC component.

The results of this simulation reveal that the transformer used in this circuit can be smaller and more efficient than that of a traditional flyback converter. The transformer turns ratio can be set as 1:1 because the final output voltage can be controlled by varying the duty ratio of the primary winding side switches when the input voltage changed from 150 V to 300 V. The duty ratio range was about 0.11 (300 V) to about 0.4 (150 V). A duty ratio of 0.5 produces a square wave on the primary winding side of the transformer.

The results of this simulation additionally reveal that the circuit is extremely easy to control. Two of the three switches on the primary winding side shared the same control command and were symmetric with the other switch. The two secondary side switches shared the exact same control signals as the primary side.

One exemplary embodiment of a DC/DC power converter employing such a circuit may have the following characteristics:
  Input Voltage: (150, 300) V
  Output power: (45-90) W
  Switching frequency: (500) kHz
  Insulation between primary side and secondary side: (Yes/No)
  Conversion efficiency: (>90.1% estimated)

As noted above, the efficiency of the exemplary converter is estimated. The rationale behind the efficiency estimate considers that the measured turn off loss of a 200 V, 12 A rated GaN device at 100 V and 5 A during a double pulse test is 1.7 μJ. The switching devices in the exemplary quasi-switched capacitor circuit (QSC) have zero current at turn on and 4 A at turn off. The maximum voltage stress of the devices is 200 V. Thus, the overall switching loss of the QSC circuit can be estimated to be 4.08 W.

Furthermore, the conduction loss of the GaN devices in this case is less than 0.1 W. The major conduction loss of the circuits will be in the transformer and the traces on the circuit board. Therefore, assuming that the transformer's efficiency is 96% (3 W of loss), then the estimated secondary side switching loss is 3 W, conduction loss is 0.5 W, and the estimated power consumption from gate drive and control circuits is 1.2 W. Consequently, the total power loss of the circuit will be about 8.88 W and the efficiency is approximately 90.1%. All of the above-estimated switching and conduction losses of the devices are based on double tests and Rds on measurements of EPC 1010.

Flyback converters of the invention include any application where an isolated DC/DC converter is required. Such applications may include, but are not limited to, hybrid electric vehicles and laptop and desktop computers.

In the case of EVs and HEVs, for example, a DC/DC converter is required to deliver power from a high voltage (HV) DC bus to 12 V loads, such as head lamps, radio system, etc., of the vehicle, as well as to provide a bias voltage to various electronic control modules. The converter must incorporate electrical isolation to protect the low voltage (LV) electronic system from potentially hazardous high voltage. Various full-bridge or half-bridge based DC/DC converters have been proposed for this purpose, however, the associated topologies cause the HV-side switches and the transformer to suffer from voltages stresses that are equal to the HV DC bus voltage. A traditional flyback converter, which is usually employed in low power applications, is likewise not a suitable topology.

In contrast to the aforementioned full-bridge and half-bridge DC/DC converters, and even to more recently proposed flyback topology-based DC/DC converters, flyback converters according to the invention are highly suitable for delivering power from a high voltage DC bus to 12 V loads in EV and HEV applications. In a flyback converter of the invention, the magnetic components store energy when corresponding HV-side switches are turned on, and release energy to the load in certain switching modes when corresponding HV-side switches are turned off. Consequently, HV-side switch voltage stresses are reduced to ⅔ of the input voltage, transformer voltage stress is reduced to ⅓ of the input voltage, low soft-switching occurs, and the converter operates with high efficiency and simple control.

The front-stage circuit may also be separately used in non-isolated DC/DC converters that may be employed in, without limitation, data centers and telecom and datacom systems. More broadly, the front-stage circuit may be used in any converter that drives any load composed of a paralleling inductor and resistor. Examples of such applications may include, for example, inductive heating, wireless charging for hybrid electric vehicles, and wireless energy. Applications for the front-stage circuit of the flyback converter invention also include the use thereof in virtually any application where an isolated DC/DC converter is required, such as without limitation, electric vehicles (EVs), hybrid electric vehicles (HEVs) and laptop and desktop computers.

Flyback converters according to the invention improve upon known flyback converter design in a number of ways. For example, generally speaking, the flyback converter circuit according to the invention is friendlier toward high switching frequency, wide band gap, devices than are traditional circuits.

Importantly, the voltage stress on the components of a flyback converter of the invention are also reduced in comparison to a traditional flyback converter. More specifically, the voltage stress on the switches is $V_{in}+N_1 \cdot V_{out}/N_2$ in a traditional flyback converter, whereas voltage stress on the switches is reduced to ⅔ of the input voltage in a flyback converter according to the invention. This allows for the use of switches with a lower rated breakdown voltage. Also, in a traditional flyback converter, the voltage stress on transformer is $V_{in}$, whereas the voltage stress on the transformer is only ⅓ of $V_{in}$ in a flyback converter of the invention. This allows, on the one hand, for the transformer turns ratio to be lowered while providing the same output voltage of a traditional flyback converter, and on the other hand, for the flux to be lowered, which results in a reduction of the core loss.

In a flyback converter according to the invention, the transformer flux is bidirectional instead of unidirectional as in a traditional flyback converter. This allows for either a reduction of the transformer core size or for a better utilization of an existing core, and also helps to prevent core saturation.

In a traditional flyback converter, when the switch is off, the energy stored in the transformer leakage inductance has no release path and, therefore, snubber circuits are needed to protect the switch from voltage overshoot. In contrast, natural current routes exist in a flyback converter according to the invention when all the switches are off, thereby facilitating a release of the energy stored in the transformer leakage inductance. Consequently, a flyback converter according to the invention does not require a snubber circuit.

A flyback converter of the invention exhibits natural soft switching at switch turn on because the transformer inductances limit the changing rate of the current. This results in zero-current switching and reduces switching losses (the turn on loss is almost zero) and increases efficiency.

More specifically, the turn-on process is zero voltage switching with respect to the secondary winding side switches $S_3$ and $S_4$ because the transformer leakage inductance $L_S$ limits the switch current increasing rate while the voltage across the switch drops instantly. Likewise, the turn-off process of switches $S_3$ and $S_4$ are zero current switching because a decreasing current is conducting in the switch body diode, and the process is completed after the current reaches zero. On the primary winding side, the turn-on process is zero voltage switching for the switches $S_1$ and $S_2$ because $L_1$, $L_2$ and $L_S$ limits the switch current increasing rate while the voltage across the switch drops instantly. The turn-off processes of switches $S_1$ and $S_2$ are hard switching. However, these processes can be improved to achieve soft switching by paralleling capacitors to the switches to slow down the rising of the voltages across the switches.

In a flyback converter of the invention, there is very low DC offset current in the transformer mutual inductance, thereby reducing transformer core loss and shrinking the transformer profile. More specifically, on the secondary winding side, the branch composed of series-connected inductors $L_1$ and $L_2$ are connected in parallel with the transformer mutual inductance. Because the sum of the inductances of inductors $L_1$ and $L_2$ is much smaller than the transformer mutual inductance, the DC offset current in the transformer mutual inductance is highly reduced. Therefore, it is possible to choose a smaller transformer magnetic core and the transformer profile can be reduced.

The secondary winding (post-stage) circuit may be traditional rectifying circuit or ripple current canceling circuit. Synchronous rectification may be applied in the post-stage circuit. In the case of a ripple current cancelling circuit, the secondary winding side (post-stage) circuit of a flyback converter of the invention also cancels ripple current seen at the output capacitor. More particularly, the post-stage circuit can be thought of as two interleaving buck converters. Since there is a 180 degree phase shift between the current waveforms of inductors $L_1$ and $L_2$, the flux thereof will be mutually cancelled if inductors $L_1$ and $L_2$ are made into coupled inductors. This results in cancelled output capacitor ripple current and allows for the use of a transformer with a reduced profile. This also allows for a smaller capacitor to be used.

In the post-stage circuit of a flyback converter according to the invention, the two active switches $S_3$ and $S_4$ can share the same ground, which is also the ground of the output voltage. Consequently, only two low-side switch gate drivers are needed for switches $S_3$ and $S_4$, which avoids the need for a more complex high-side switch gate driver.

While certain exemplary embodiments of the present invention are described in detail above, the scope of the invention is not to be considered limited by such disclosure, and modifications are possible without departing from the spirit of the invention as evidenced by the following claims:

What is claimed is:
1. A flyback DC/DC converter, comprising:
a circuit comprising a high-voltage side and a low-voltage side separated by a transformer;
wherein the high voltage side comprises at least a first switch, a pair of second switches, and a first capacitor and a second capacitor;
wherein each of the pair of second switches is connected to the first capacitor and the second capacitor such that the first capacitor and the second capacitor are separated by the pair of second switches;
wherein the low voltage side comprises a third switch and a fourth switch, at least one capacitor, and at least a first inductor and a second inductor;
wherein the switches are actuatable in various combinations at a selected switching frequency to produce both active modes and deadband modes of operation within a given switching period;
wherein the first capacitor and the second capacitor are configured to store energy when the first switch is turned on and the first capacitor and the second capacitor are configured to release energy when the pair of second switches are turned on, and to release energy to a load only; and
wherein the active modes comprise a mode wherein the first capacitor, the second capacitor, and a primary winding of the transformer are charged in series.

2. The flyback converter of claim 1, wherein the switches are active power devices.

3. The flyback converter of claim 1, wherein:
when first switch is turned on, the first inductor is adapted to store energy, and when the first switch is turned off, the first inductor is adapted to release energy to a load; and
wherein, when the pair of second switches is turned on, the second inductor is adapted to store energy, and when the pair of second switches are turned off, the second inductor is adapted to release energy to the load.

4. The flyback converter of claim 1, wherein:
the first inductor and the second inductor may be a coupled inductor, the coupled inductor having two coupled windings.

5. The flyback converter of claim 1, wherein the converter is adapted to operate with a symmetrical duty ratio and a variable deadband ratio.

6. The flyback converter of claim 1, wherein the high-voltage side is a DC/AC circuit having a ratio of approximately 3:1, when operated with a symmetrical duty ratio, and an AC output voltage having a peak value that is approximately ⅓ of the input voltage supplied to the converter.

7. The flyback converter of claim 1, wherein an output voltage of the converter is regulatable by changing the switch duty ratio and deadband of the first switch and the pair of second switches.

8. The flyback converter of claim 1, wherein the first switch and the pair of second switches are adapted to be driven with a symmetrical duty ratio and the third switch and the fourth switch are adapted to operate in synchronous rectification.

9. The flyback converter of claim 1, wherein the low-voltage side circuit is selected from the group consisting of a traditional rectifying circuit and a ripple cancelling circuit.

10. The flyback converter of claim 1, wherein the circuit is adapted such that the voltage stress on the switches is approximately $2/3$ of the input voltage supplied to the converter and the voltage stress on the transformer is approximately $1/3$ of the input voltage supplied to the converter when the converter is operated with a symmetrical duty ratio.

11. The flyback converter of claim 1, wherein the third switch and the fourth switch exhibit zero current switching during both turn-on and turn-off thereof, and the first switch and the pair of second switches exhibit zero current switching during turn-on thereof.

12. The flyback converter of claim 1, wherein the circuit is adapted such that there will be four active modes and four deadband modes within a given switching period when the converter is operated in steady state.

13. A flyback DC/DC converter, comprising:
a circuit having a front-stage side and a post-stage side separated by a transformer, the front-stage side adapted for connection to an input voltage source;
a first capacitor and a second capacitor on the front-stage side, and a third capacitor on the post-stage side;
a first inductor and a second inductor on the post-stage side; and
a first switch and a pair of second switches located on the front-stage side and a third switch and a fourth switch located on the post stage side, the switches being actuatable in various combinations and at a selected switching frequency within a given switching period;
wherein each of the pair of second switches is connected to the first capacitor and the second capacitor such that the first capacitor and the second capacitor are separated by the pair of second switches;
wherein the first capacitor, the second capacitor, and a primary winding of the transformer are connected in series when the first switch is turned on and the second pair of switches are turned off;
wherein the first capacitor, the second capacitor, and the primary winding of the transformer are connected in parallel when the second pair of switches are turned on;
wherein, in steady-state operation, the voltage stress on the switches is about $2/3$ of the input voltage and the voltage stress on the transformer is about $1/3$ of the input voltage; and
wherein the third and fourth switches exhibit zero current switching during both turn-on and turn-off thereof, and the first and second switches exhibit zero current switching during turn-on thereof.

14. The flyback converter of claim 13, wherein the converter is adapted to operate with a symmetrical duty ratio and a variable deadband ratio.

15. The flyback converter of claim 13, wherein the front-stage side is a DC/AC circuit having a ratio of approximately 3:1 and an AC output voltage having a peak value that is approximately $1/3$ of the input voltage.

16. The flyback converter of claim 13, wherein an output voltage of the converter is regulatable by changing the switch duty ratio and deadband of the first switch and the second pair of switches.

17. The flyback converter of claim 13, wherein the first switch and the second pair of switches are adapted to be driven with a symmetrical duty ratio and the third switch and fourth switch are adapted to operate in synchronous rectification.

18. The flyback converter of claim 13, wherein the post-stage side circuit is selected from the group consisting of a traditional rectifying circuit and a ripple cancelling circuit.

19. A method of performing DC/DC power conversion, comprising:
(a) providing a flyback DC/DC converter circuit, comprising:
a high-voltage side in the form of a DC/AC circuit that is adapted for connection to an input voltage source and has a ratio of approximately 3:1, and a low-voltage side selected from the group consisting of a traditional rectifying circuit and a ripple cancelling circuit, the high-voltage side and the low-voltage side separated by a transformer,
a first switch and a second pair of switches on the high-voltage side and a third switch and a fourth switch on the low-voltage side,
a first capacitor and a second capacitor on the high-voltage side, and a third capacitor on the low-voltage side, wherein each of the pair of second switches is connected to the first capacitor and the second capacitor such that the first capacitor and the second capacitor are separated by the pair of second switches, and
a first inductor and a second inductor on the low-voltage side;
(b) actuating the switches in various combinations at a selected switching frequency to produce both active modes and deadband modes of operation within a given switching period;
(c) connecting the first capacitor, the second capacitor, and a primary winding of the transformer in series when the first switch is turned on and the second pair of switches are turned off; and
(d) connecting the first capacitor, the second capacitor, and the primary winding of the transformer in parallel when the first switch is turned off and the second pair of switches are turned on;
such that, in steady-state operation, the voltage stress on the switches is about $2/3$ of the input voltage and the voltage stress on the transformer is about $1/3$ of the input voltage.

20. The method of claim 19, wherein the converter is operated with a symmetrical duty ratio and a variable deadband ratio.

21. The method of claim 19, wherein an output voltage of the converter is regulated by changing the switch duty ratio and deadband of the first switch and the second pair of switches.

22. The method of claim 19, wherein the first switch and the second pair of switches are driven with a symmetrical duty ratio and the third switch and the fourth switch are operated in synchronous rectification.

23. The method of claim 19, wherein:
when the first switch is turned on, the first inductor stores energy, and when the first switch is turned off, the first inductor releases energy to a load; and
wherein, when the second pair of switches is turned on, the second inductor stores energy, and when the second set of switches are turned off, the second inductor releases energy to the load.

24. The method of claim 19, wherein:
the first inductor and a second inductor are a pair of coupled inductors having two coupled windings.

* * * * *